R. A. JEWETT & A. L. GREENLAW.
TRAIN PIPE COUPLING.
APPLICATION FILED JULY 26, 1909.

961,699. Patented June 14, 1910.
2 SHEETS—SHEET 1.

Witnesses:
Nathan G. Lombard
Edna C. Cleveland

Inventors:
Robert A. Jewett,
Arthur L. Greenlaw,
by Walter E. Lombard Atty.

R. A. JEWETT & A. L. GREENLAW.
TRAIN PIPE COUPLING.
APPLICATION FILED JULY 26, 1909.

961,699.

Patented June 14, 1910.

2 SHEETS—SHEET 2.

Witnesses:
Nathan C. Lombard
Edna C. Cleveland

Inventors:
Robert A. Jewett,
Arthur L. Greenlaw,
by Walter E. Lombard,
Atty.

UNITED STATES PATENT OFFICE.

ROBERT A. JEWETT, OF BOSTON, AND ARTHUR L. GREENLAW, OF MALDEN, MASSACHUSETTS, ASSIGNORS TO THE GREENLAW MANUFACTURING CO., OF BOSTON, MASSACHUSETTS, A CORPORATION OF MAINE.

TRAIN-PIPE COUPLING.

961,699.  Specification of Letters Patent.  Patented June 14, 1910.

Application filed July 26, 1909. Serial No. 509,914.

*To all whom it may concern:*

Be it known that we, ROBERT A. JEWETT and ARTHUR L. GREENLAW, citizens of the United States of America, and residents, respectively, of Boston, in the county of Suffolk, and Malden, in the county of Middlesex, both in the State of Massachusetts, have invented certain new and useful Improvements in Train-Pipe Couplings, of which the following is a specification.

This invention relates to couplings for train pipes and has for its object the production of a coupling which may be readily coupled and uncoupled under abnormal strains but which will be firmly locked together when in normal use.

The invention consists in certain novel features of construction and arrangement of parts which will be readily understood by reference to the description of the drawings and to the claims hereinafter given.

Figure 1:
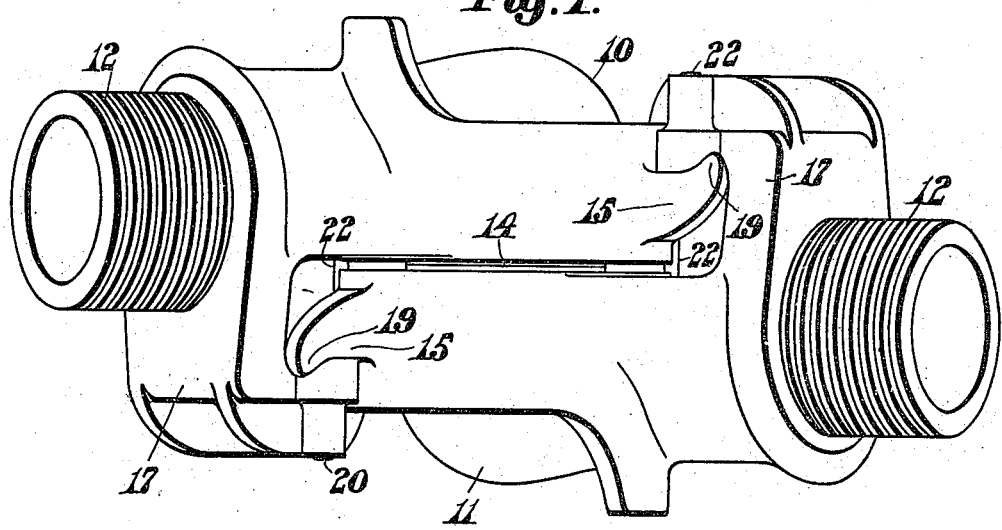
Figure 2:
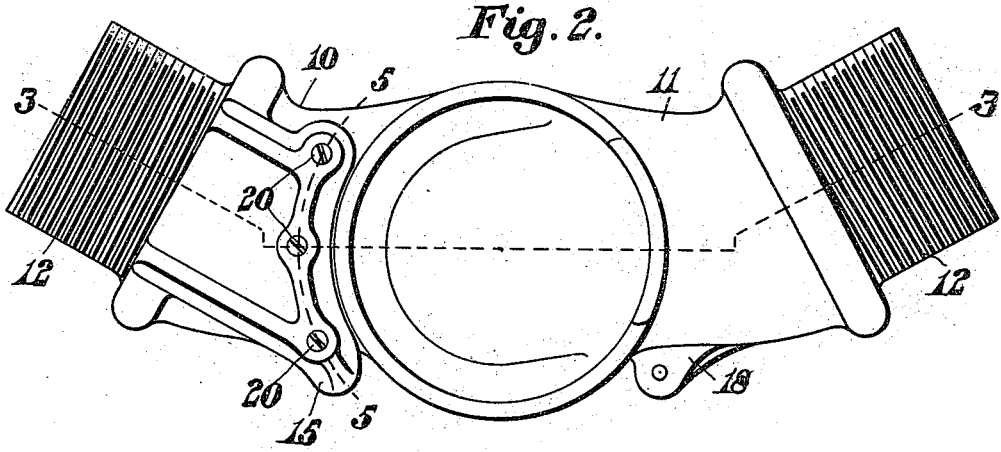
Figure 5:
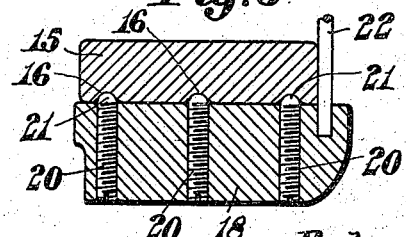
Figure 3:
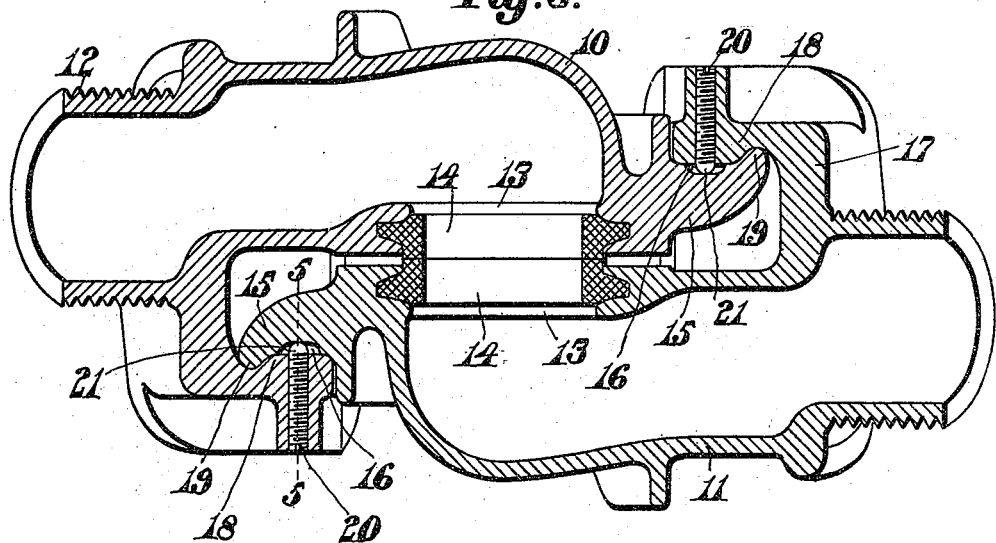
Figure 4:
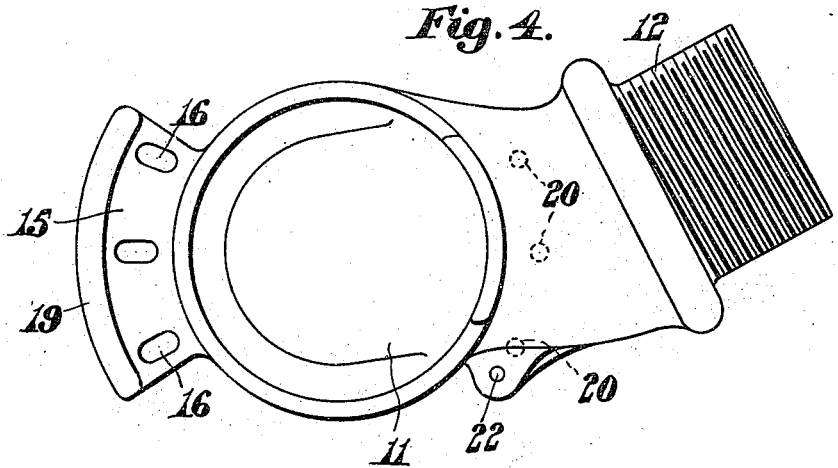

Of the drawings: Figure 1 represents a plan of a coupling embodying the features of this invention. Fig. 2 represents a side elevation of the same. Fig. 3 represents a horizontal section of the same, the cutting plane being on line 3—3 on Fig. 2. Fig. 4 represents an elevation of one of the coupling members, and Fig. 5 represents a transverse section of two of the engaging flanges, the cutting plane being on line 5—5 on Fig. 2.

Similar characters designate like parts throughout the drawings.

In the drawings, 10 and 11 represent two coupling members each having at one end a threaded tubular projection 12 by which the coupling member may be attached to any suitable train pipe in any ordinary manner. At the opposite end of each member is a side opening 13 each of which openings has embedded therein an annular resilient gasket 14, a portion of which projects beyond the side wall surrounding the opening 13 of each coupling member 10 and 11.

Each member 10 and 11 is provided with a projecting lipped flange 15 concentric with the openings 13. Each of these flanges 15 is provided with a plurality of shouldered recesses or depressions 16 preferably located equi-distant from the center of the opening 13. Near the threaded tubular projection 12 of each coupling member is another projecting flange 17 formed upon each coupling member.

Each of the flanges 17 is provided with an inwardly extending lip 18 which engages with the projecting rib or lip 19 of each of the flanges 15. Extending through and threaded to the flange 17 are a plurality of members 20 having tapered inner ends 21 which are adapted to engage with the shouldered recesses or depressions 16 when the coupling members 10 and 11 are coupled together with the projecting ends of the gaskets 14 in contact with one another and the centers of the openings 13 in alinement.

When the two members 10 and 11 are coupled together in this manner as shown clearly in Fig. 3 the resiliency of the gaskets 14 and the pressure of the material passing through the members 10 and 11 will force the two coupling members 10 and 11 apart so that the tapered ends 21 of the threaded members 20 will be firmly positioned in the recesses or depressions 16, thus preventing the coupling member from being uncoupled until some abnormal strain is brought to bear thereon. For instance, when the cars of a train are uncoupled, the abnormal strain thus brought to bear upon the pipe coupling will cause the pipe couplings to uncouple, in the operation of which the tapered ends 21 of the threaded members 20 ride over the slightly inclined shoulders of the depressions or recesses 16.

In the ordinary use of a coupling of this class in connection with the rubber hose interposed between the coupling members and the train pipes there has never been found any necessity for any locking members other than the co-acting concentric ribs 18 and 19, these having been found sufficient in connection with the resiliency of the gaskets 14 and the pressure of the circulating material to lock the coupling members together and retain them in such locked condition under all normal conditions but permitting them to readily automatically unlock them when they are subjected to any abnormal strains. When, however, the coupling members 10 and 11 are connected to the train pipes by tubular metal connections with ball and socket joints between the various members interposed between the coupling members and the train pipes, it has been found that the ordinary coupling provided with the concentric co-acting ribs 18 and 19 is insufficient to retain the coupling members in operative position, the ordinary friction on the jointed sections exceeding the tension which retains the coupling members 10 and 11 in position. As a consequence, very often when subjected to the usual strains and jars to which these train pipe connections are subjected during the travel of the train the pipe couplings 10 and 11 are often uncoupled causing much annoyance and delay in the operation of the train. Obviously this uncoupling of the train pipes at undesirable times is very objectionable and it is to obviate this objection which is the principal object of the present invention. This is accomplished in a simple manner by the provision of a plurality of shouldered depressions 16 on each of the flanges 15 and co-acting with the tapered ends 21 of the threaded members 20 in the opposing flanges 18 of the other coupling member. While these tapered ends 21 project only sufficiently far so that the coupling members 10 and 11 may be easily coupled together by the brakeman by hand the ends 21 riding over the inclined walls of the depressions 16, yet when the two members 10 and 11 have been finally positioned, as indicated in Figs. 1, 2, and 3, with the ends 21 in the depressions 16, the tension of the gaskets 14 is sufficient to lock the coupling members 10 and 11 together and retain them in locked position so that the ordinary strains brought to bear upon the coupling members will never disconnect them. As the ends 21 of the members 20 become worn the members 20 by means of the threads 21 may be adjusted to take up the wear. The pins 22 serve to limit the movement of the coupling members 10 and 11 and retain them at the desired angle to each other when in operation.

It is believed that the operation and many advantages of the invention will be fully understood from the foregoing.

Having thus described our invention, we claim:

1. The combination of two interlocking pipe members having side openings each of which is provided with a surface depression the walls of which are radial to said side openings; and a projecting member on each member adapted to engage in the depression upon the other member.

2. The combination of two interlocking pipe members having side openings each of which is provided with a surface depression the walls of which are radial to said side openings; and a projecting bevel-ended member on each member adapted to engage in the depression upon the other member.

3. The combination of two interlocking pipe members having side openings each of which is provided with a plurality of surface depressions the walls of which are radial to said side openings; and a projecting member on each member adapted to engage in one of the depressions upon the other member.

4. The combination of two interlocking pipe members having side openings each of which is provided with a plurality of surface depressions the walls of which are radial to said side openings; and a plurality of projecting members on each member adapted to engage in the depressions upon the other member.

5. The combination of two interlocking pipe members each of which is provided with a plurality of surface depressions; and an adjustable projecting member adapted to engage with one of said depressions in the other member.

6. The combination of two interlocking pipe members each of which is provided with a plurality of depressions; and a plurality of adjustable projecting members adapted to engage with a plurality of said depressions in the other member.

7. The combination of two pipe members having side openings provided with projecting resilient gaskets adapted to register with each other; interlocking flanges on said members, one of which on each member is provided with a depression having walls radial to said side openings; and a projection on each of the other flanges adapted to engage one of said depressions.

8. The combination of two pipe members having side openings provided with projecting resilient gaskets adapted to register with each other; interlocking flanges on said members one of which on each member is provided with a plurality of depressions; and a projection on each of the other flanges adapted to engage one of said depressions.

9. The combination of two pipe members having side openings provided with projecting resilient gaskets adapted to register with each other; interlocking flanges on said members, one of which on each member is provided with a plurality of depressions; and an adjustable projection on each of the other flanges adapted to engage one of said depressions.

10. The combination of two pipe members having side openings provided with projecting resilient gaskets adapted to register with each other; interlocking flanges on said members concentric to said openings, one of which on each member is provided with a plurality of depressions; and an adjustable projection on each of the other flanges adapted to engage one of said depressions.

11. The combination of two pipe members having side openings provided with projecting resilient gaskets adapted to register with each other; flanges on said members provided with interlocking ribs concentric with said openings; and shouldered members on said flanges adapted to ride over each other during the positioning of said pipe members and to be held in engagement by the tension of said gaskets when said pipe members are positioned.

Signed by us at 4 Post Office Sq., Boston, Mass., this 20th day of July, 1909.

ROBERT A. JEWETT.
ARTHUR L. GREENLAW.

Witnesses:
ROBERT BALL EDES,
NATHAN C. LOMBARD.